(12) United States Patent
Larson et al.

(10) Patent No.: US 11,232,014 B2
(45) Date of Patent: Jan. 25, 2022

(54) COUNTERMEASURE IMPLEMENTATION FOR PROCESSING STAGE DEVICES

(71) Applicant: Hewlett-Packard Development Company, L.P., Spring, TX (US)

(72) Inventors: Bradley R Larson, Boise, ID (US); Paul N Ballard, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/978,596

(22) PCT Filed: Apr. 30, 2018

(86) PCT No.: PCT/US2018/030301
§ 371 (c)(1),
(2) Date: Sep. 4, 2020

(87) PCT Pub. No.: WO2019/212518
PCT Pub. Date: Nov. 7, 2019

(65) Prior Publication Data
US 2021/0034498 A1 Feb. 4, 2021

(51) Int. Cl.
*G06F 11/00* (2006.01)
*G06F 11/34* (2006.01)
*G06F 3/12* (2006.01)

(52) U.S. Cl.
CPC ........ *G06F 11/3476* (2013.01); *G06F 3/1214* (2013.01); *G06F 3/1277* (2013.01); *G06F 11/3409* (2013.01)

(58) Field of Classification Search
CPC ............. G06F 11/3409; G06F 11/3476; G06F 11/076; G06F 11/0793; G06F 3/1214; G06F 3/1277
See application file for complete search history.

(56) References Cited

U.S. PATENT DOCUMENTS

| | | | |
|---|---|---|---|
| 6,581,150 B1 * | 6/2003 | Col | G06F 9/30043 711/169 |
| 6,795,798 B2 | 9/2004 | Eryurek | |
| 7,016,061 B1 | 3/2006 | Hewitt | |

(Continued)

OTHER PUBLICATIONS

Written opinion of the international searching authority for PCTUS2018030301, dated Jan. 21, 2019, pp. 1-4 (Year: 2019).*

(Continued)

*Primary Examiner* — Elmira Mehrmanesh
(74) *Attorney, Agent, or Firm* — Mannava & Kang

(57) ABSTRACT

According to examples, an apparatus may include a first processing stage device to process data, a second processing stage device to process the processed data, and a control device. The control device may access first performance information of the first processing stage device, determine, from the accessed first performance information, an operational state of the first processing stage device, and determine whether a countermeasure is to be taken based on the determined operational state of the first processing stage device, in which the countermeasure is to improve the operational state of the first processing stage device. The control device may also, based on a determination that a countermeasure is to be taken, output an instruction for the countermeasure to be implemented.

16 Claims, 5 Drawing Sheets

(56) References Cited

U.S. PATENT DOCUMENTS

| | | | |
|---|---|---|---|
| 7,925,805 B2* | 4/2011 | Shin | G06F 3/061 |
| | | | 710/56 |
| 8,024,590 B2* | 9/2011 | Song | G06F 1/00 |
| | | | 713/321 |
| 10,169,060 B1* | 1/2019 | Vincent | H04L 49/20 |
| 10,901,669 B2* | 1/2021 | Kahwaji | G06F 3/1282 |
| 2003/0063123 A1 | 4/2003 | Fukube | |
| 2005/0131656 A1 | 6/2005 | Ikeda | |
| 2006/0232809 A1 | 10/2006 | Chapman et al. | |
| 2009/0164812 A1* | 6/2009 | Capps, Jr. | G06F 1/3203 |
| | | | 713/320 |
| 2010/0046685 A1* | 2/2010 | Liu | H04L 27/2656 |
| | | | 375/364 |
| 2010/0100884 A1* | 4/2010 | Green | G06F 9/5083 |
| | | | 718/104 |
| 2010/0238519 A1 | 9/2010 | Wang | |
| 2011/0213488 A1 | 9/2011 | Suzuki | |
| 2012/0075662 A1 | 3/2012 | Giannetti | |
| 2013/0070294 A1 | 3/2013 | Mochizuki | |
| 2013/0185377 A1* | 7/2013 | Ignatius | G06F 12/02 |
| | | | 709/213 |
| 2013/0293926 A1* | 11/2013 | Giannetti | G06F 3/1288 |
| | | | 358/1.15 |
| 2015/0278149 A1* | 10/2015 | Kogan | H04N 21/4122 |
| | | | 710/52 |
| 2015/0293795 A1* | 10/2015 | Stern | G06F 11/3409 |
| | | | 718/102 |
| 2017/0160993 A1 | 6/2017 | Abe | |
| 2018/0300145 A1* | 10/2018 | Lauritzen | G06T 1/20 |
| 2021/0124611 A1* | 4/2021 | Saillet | G06N 5/04 |

OTHER PUBLICATIONS

Bar Tender—Status Monitoring Using Drivers by Seagull™ to Display Printer Status Information, Nov. 9, 2015, Seagull Scientific Inc—White Paper—10 pages.

* cited by examiner

300

```
┌─────────────────────────────────────────────┐
│ ACCESS FIRST PERFORMANCE INFORMATION OF A FIRST │
│         PROCESSING STAGE DEVICE             │
│                   302                       │
└─────────────────────────────────────────────┘
                     ↓
┌─────────────────────────────────────────────┐
│  ACCESS SECOND PERFORMANCE INFORMATION OF A │
│        SECOND PROCESSING STAGE DEVICE       │
│                   304                       │
└─────────────────────────────────────────────┘
                     ↓
┌─────────────────────────────────────────────┐
│ DETERMINE A FIRST OPERATIONAL STATE OF THE FIRST │
│         PROCESSING STAGE DEVICE             │
│                   306                       │
└─────────────────────────────────────────────┘
                     ↓
┌─────────────────────────────────────────────┐
│  DETERMINE A SECOND OPERATIONAL STATE OF THE │
│       SECOND PROCESSING STAGE DEVICE        │
│                   308                       │
└─────────────────────────────────────────────┘
                     ↓
┌─────────────────────────────────────────────┐
│  DETERMINE WHETHER A CORRECTIVE ACTION IS TO BE │
│                   TAKEN                     │
│                   310                       │
└─────────────────────────────────────────────┘
                     ↓
┌─────────────────────────────────────────────┐
│ BASED ON A DETERMINATION THAT THE CORRECTIVE │
│ ACTION IS TO BE TAKEN, OUTPUT AN INSTRUCTION FOR │
│  THE CORRECTIVE ACTION TO BE IMPLEMENTED    │
│                   312                       │
└─────────────────────────────────────────────┘
```

*FIG. 3*

COUNTERMEASURE IMPLEMENTATION FOR PROCESSING STAGE DEVICES

BACKGROUND

In printing systems, the data representing an image that is to be printed may be converted to a raster format in order for a print engine to accurately deposit toner or ink on a print media. Oftentimes, an application at a host computer may create a digital image data file, referred to as a print job, and a print driver may convert the digital image to a page description language (PDL) file that is suitable to be transmitted to a buffer of a printing system. A print data pipeline of the printing system may perform several operations upon the transferred print data as the print data enters the pipeline in preparation for printing. These operations may include print data compression, print data decompression, color space conversion, half toning, and formatting. Following these operations, the printing system may print the print data onto a print media.

BRIEF DESCRIPTION OF DRAWINGS

Features of the present disclosure are illustrated by way of example and not limited in the following figure(s), in which like numerals indicate like elements, in which:

FIGS. 3 and 4, respectively, depict flow diagrams of example methods for managing operational states of a first processing stage device and a second processing stage device.

DETAILED DESCRIPTION

Figure 1:
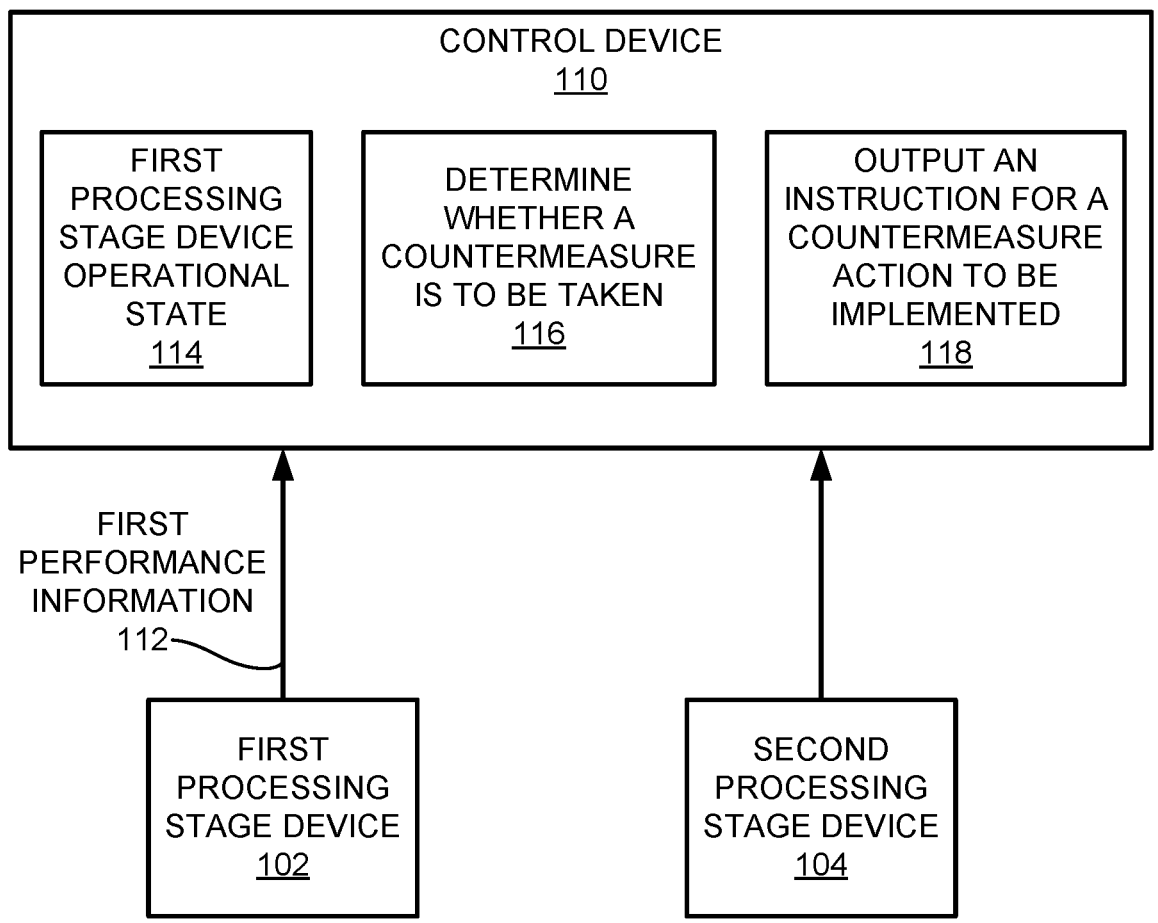
FIG. 1 depicts a block diagram of an example apparatus for managing an operational state of a first processing stage device.

For simplicity and illustrative purposes, the principles of the present disclosure are described by referring mainly to examples thereof. In the following description, numerous specific details are set forth in order to provide an understanding of the examples. It will be apparent, however, to one of ordinary skill in the art, that the examples may be practiced without limitation to these specific details. In some instances, well known methods and/or structures have not been described in detail so as not to unnecessarily obscure the description of the examples. Furthermore, the examples may be used together in various combinations.

Throughout the present disclosure, the terms "a" and "an" are intended to denote one of a particular element or multiple ones of the particular element. As used herein, the term "includes" means includes but not limited to, the term "including" means including but not limited to. The term "based on" means based at least in part on.

A number of processes may be implemented to keep many types of devices, such as multifunction printing devices, printing devices, computing systems, etc., operating smoothly and in a timely manner. For instance, the processes may be in a pipeline such that the processes may be executed one after the other as the data works through the pipeline. By way of example, in a printing process, pages may be streamed off of a disk, decompressed, processed through blocks that perform image quality processing, engine-specific treatments, halftoning, etc., and may be converted into analog pulses and control signals appropriate for a marking engine used. In instances in which operation of any of these processes is delayed or falls behind schedule, printing of images on media may be delayed significantly, or even fail to print correctly. As a result, the processes may be performed at certain rates to ensure that the images are printed in a smooth and timely manner, e.g., such that the marking engine may print at full speed and maintain a certain level of throughput.

Disclosed herein are apparatuses and methods for managing an operational state of a first processing stage device such that processes in a pipeline of processes may be performed at a desired speed. The apparatuses disclosed herein may monitor performance information of the first processing stage device to determine the operational state of the first processing stage device. The operational state of the first processing stage device may be an indication of the health of the first processing stage device. That is, for instance, the operational state may be an indication as to whether the first processing stage device is operating a desired rate, e.g., storing first buffers at a particular rate.

The apparatuses disclosed herein may also manage the operational state of the first processing stage device by causing a countermeasure (recited equivalently herein as a corrective action) to be taken to improve the operational state of the first processing stage device. By improving the operational state of the first processing stage device, the apparatuses may prevent or reduce a likelihood of a slowdown in the pipeline of processes from occurring. The countermeasure may be an action that may be taken, for instance, to move resource utilization from one component in the apparatus such that the first processing stage device may process data at a faster rate. For instance, the countermeasure may include pausing a non-critical process, raising a priority of the pipeline bus, and/or the like.

The apparatuses disclosed herein may also accumulate information pertaining to the implemented countermeasures and may analyze the information identify parameters of healthy apparatuses, determine whether a corrective action is to be implemented, determine whether there may be larger issues with respect to components in the apparatus, etc. The apparatuses disclosed herein may additionally or alternatively output the information to a cloud based server that may accumulate the information. The analyzed information be used to identify components that may be failing, have a larger number of issues as compared with other components, causes of slowdowns, predict failures, etc.

Through implementation of the apparatuses and methods disclosed herein, slowdowns in the processing of data along a pipeline may be reduced or eliminated. As a result, the apparatuses disclosed herein may output the processed data, e.g., printed as images, displayed as images, etc., at intended speeds. A technical improvement that the apparatuses and methods disclosed herein may be in that the processing stage devices in a pipeline may be operated at healthy levels to reduce or eliminate slowdowns in the processing of data.

With reference first to FIG. 1, there is shown a block diagram of an example apparatus 100 for managing an operational state of a first processing stage device. Particularly, the apparatus 100 may manage the operational state of the first processing stage device through monitoring of performance information and determining whether a countermeasure is to be taken based on the monitored performance information. It should be understood that the apparatus 100 depicted in FIG. 1 may include additional features and that some of the features described herein may be removed and/or modified without departing from the scope of the apparatus 100.

The apparatus 100 may be part of a multifunction printing device, a printing device, a computing device, or the like. For instance, the apparatus 100 may include components that may perform a pipeline of processes to perform an operation. By way of example, the processes may be implemented to print an image on a document. In this example, the processes may include, for instance, streaming compressed data off a disk, decompressing the data, performing image quality processing, performing print engine-specific treatments to the data, halftoning the data, and/or the like. Following these processes, the processed data may be converted into analog pulses and control signals appropriate for a marking engine used to print an image on the documents. These processes may affect the speeds at which images may be printed. Additionally, delays or failures in any of these processes may result in other problems, such as data underruns and/or overruns, which may result in lost data, malformed data, and possibly incomplete termination of a print job.

As another example, the processes may be implemented to display an image on a display screen. In this example, the processes may include, for instance, rendering display frames or layers, image processing such as color correction/enhancement, streaming compressed data, decompressing the compressed data, formatting the decompressed data, copying/updating frame buffers, composing/flattening layer data, and/or the like. Following these processes, the processed data may be converted into analog pulses and control signals appropriate for a display engine used to display an image on a display screen. The quality of the displayed images may be affected by these processes. For instance, a delay or failure in any of these processes may result in the display of visual artifacts such as tearing, jitter, jumpiness, etc. The apparatus 100 may also be implemented for image scanning applications, or any other application with near real-time or hard real-time data delivery constraints.

As shown, the apparatus 100 may include a first processing stage device 102 and a second processing stage device 104 that may perform some of the processing operations discussed herein. The first processing stage device 102 and the second processing stage device 104 may each be devices that may process data or otherwise perform operations on data along a processing pipeline. That is, the first processing stage device 102 and the second processing stage device 104 may operate on the data as part of a chain of operations as the data works its way through the pipeline. Thus, for instance, the first processing stage device 102 may perform a data processing operation and the second processing stage device 104 may perform another data processing operation on data that the first processing stage device 102 has processed. In this regard, the second processing stage device 104 may be further along a data processing pipeline than the first processing stage device 102.

Either or both of the first processing stage device 102 and the second processing stage device 104 may be a dedicated hardware block in the apparatus 100, such as a circuit component, an application specific integrated circuit (ASIC), a chip, a field-programmable gate array (FPGA), and/or other hardware device. According to examples, either or both of the first processing stage device 102 and the second processing stage device 104 may be a processing device on which firmware and/or software may be stored to perform processing operations. For instance, the processing device may include a controller and a memory on which machine readable instructions may be stored.

The apparatus 100 may also include a control device 110 that may perform management operations in the apparatus 100. The control device 110 may be a dedicated hardware block in the apparatus 100, such as a central processing unit, a microprocessor, a circuit component, an application specific integrated circuit (ASIC), a chip, a field-programmable gate array (FPGA), and/or other hardware device. According to examples, the control device 110 may be a processor that may execute firmware and/or software. For instance, the control device 110 may include a processor that may access a memory on which machine readable instructions that provide the functionality for the control device 110 may be stored.

As also shown, the control device 110 may access first performance information 112 from the first processing stage device 102. The first performance information 112 may include parameters or metrics regarding the first processing stage device 102 that may be monitored. For instance, the parameters or metrics may include a number of buffers currently ready for the first processing stage device 102, a buffer fill/drain rate for the first processing stage device 102, a pixel processing rate of the first processing stage device 102, an idle/active time measure for the first processing stage device 102, a block processing average rate for the first processing stage device 102, a source data rate measure for the first processing stage device 102, and/or the like. According to examples, the first processing stage device 102 may track the parameters or metrics regarding the first processing stage device 102 and may submit the first performance information 112 corresponding to the tracked parameters or metrics to the control device 110. In other examples, a device external to the first processing stage device 102 may monitor the parameters or metrics and may submit the first performance information 112 to the control device 110.

The control device 110 may determine, from the accessed first performance information 112, a first processing stage device operational state 114. The operational state 114 of the first processing stage device 102 may be, for instance, whether the first processing stage device 102 is operating at a intended rate. For instance, the control device 110 may determine that the first processing device 102 is at a first operational state based on the first performance information 112 indicating that a parameter is above a predefined threshold. In addition, the control device 110 may determine that the first processing device 102 is at a second operational state based on the first performance information 112 indicating that the parameter is below the predefined threshold.

In other examples, the control device 110 may determine that the first processing device 102 is at any of a number of other operational states. For instance, the control device 110 may determine whether the parameter identified in the first performance information 112 falls below or exceeds a number of predefined thresholds, in which each of the predefined thresholds may correspond to a particular operational state of a number of operational states. In these examples, the control device 110 may determine which of the predefined thresholds the identified parameter exceeds or falls below. Based on that determination, the control device 110 may determine the operational state 114 of the first processing stage device 102. The different operational states 114 may also correspond to different severity levels. For instance, a first operational state 114 may correspond to a low severity level, a second operational state 114 may correspond to a high severity level, and a third operational state 114 may correspond to a critical severity level. The severity levels may be based, for instance, on the likelihood that the first processing stage device 102 may be operating at a level that may cause a slowdown or a stoppage in the data processing pipeline.

By way of particular example in which the parameter is the number of buffers containing data that the first processing stage device 102 has processed and are currently ready for the second processing stage device 104 to access, the predefined threshold may be a certain number of those buffers. The certain number of those buffers may be based on a rate at which the second processing stage device 104 accesses those buffers. For instance, the certain number of buffers may be a number that results in the second processing stage device 104 having a sufficient number of buffers to access to prevent the second processing stage device 104 from running out of buffers having data that the second processing stage device 104 is to process in a data processing operation pipeline.

The control device 110 may also determine whether a countermeasure is to be taken 116 based on the determined operational state 114 of the first processing stage device 102, in which the countermeasure may improve the operational state of the first processing stage device 102. For instance, the control device 110 may determine that a countermeasure is to be taken based on the first processing stage device 102 being at a particular operational state 114. In keeping with the example discussed above in which the control device 110 may have determined that the first processing stage device 102 is in an operational state 114 in which there is likelihood that the second processing state device 104 may run out of buffers containing data for the second processing state device 104 to process. In these examples, the control device 110 may determine that a countermeasure is not to be taken in instances in which the operational state 114 of the first processing stage device 102 is above a predefined threshold.

Generally speaking, the countermeasure, which may equivalently be recited as a corrective action herein, may be an action that may be taken in the apparatus 100 to improve the operational state 114 of the first processing stage device 102. For instance, the countermeasure may be an action that may bring the parameters or metrics monitored at the first processing stage device 102 to be within a predefined threshold range, above a predefined threshold level, below a predefined threshold level, or the like. Examples of countermeasures may include, for instance, temporarily modifying bus arbitration priorities to unfairly favor critical stages in a pipeline (e.g., temporarily selecting critical stages in the pipeline to be the bus master more frequently than non-critical stages), briefly modifying power consumption policies to temporarily allow additional performance, raising critical thread priorities, lowering non-critical thread priorities, temporarily suspending non-critical or non-real-time operations, suspending or diverting contending processes to other resources, re-allocating memory to critical operations, and/or the like. According to examples, the control device 110 may select the countermeasure from a set of countermeasures that includes at least two of the above-cited countermeasures.

The control device 110 may, based on a determination that a countermeasure is to be taken, output an instruction for the countermeasure to be implemented. In some examples in which the control device 110 has control over implementation of the countermeasure, the control device 110 may output an instruction that results in the countermeasure being implemented. In other examples, the control device 110 may output an instruction for another device to implement the countermeasure. The control device 110 may continue to monitor the operational state 114 of the first processing stage device 102 to determine whether the first processing stage device 102 has returned to a state above the predefined threshold level. Based on a determination that the first processing stage device 102 has returned to a state above the predefined threshold level within a certain period of time, the control device 100 may cause the countermeasures to be reverted back to their standard operating conditions. Alternately, in instances in which the control device 110 determines that the state of the first processing stage device 102 continues to degrade, the control device 110 may determine 228 that additional and/or more aggressive countermeasures may be implemented and may cause the more aggressive countermeasures to be implemented.

Figure 2:
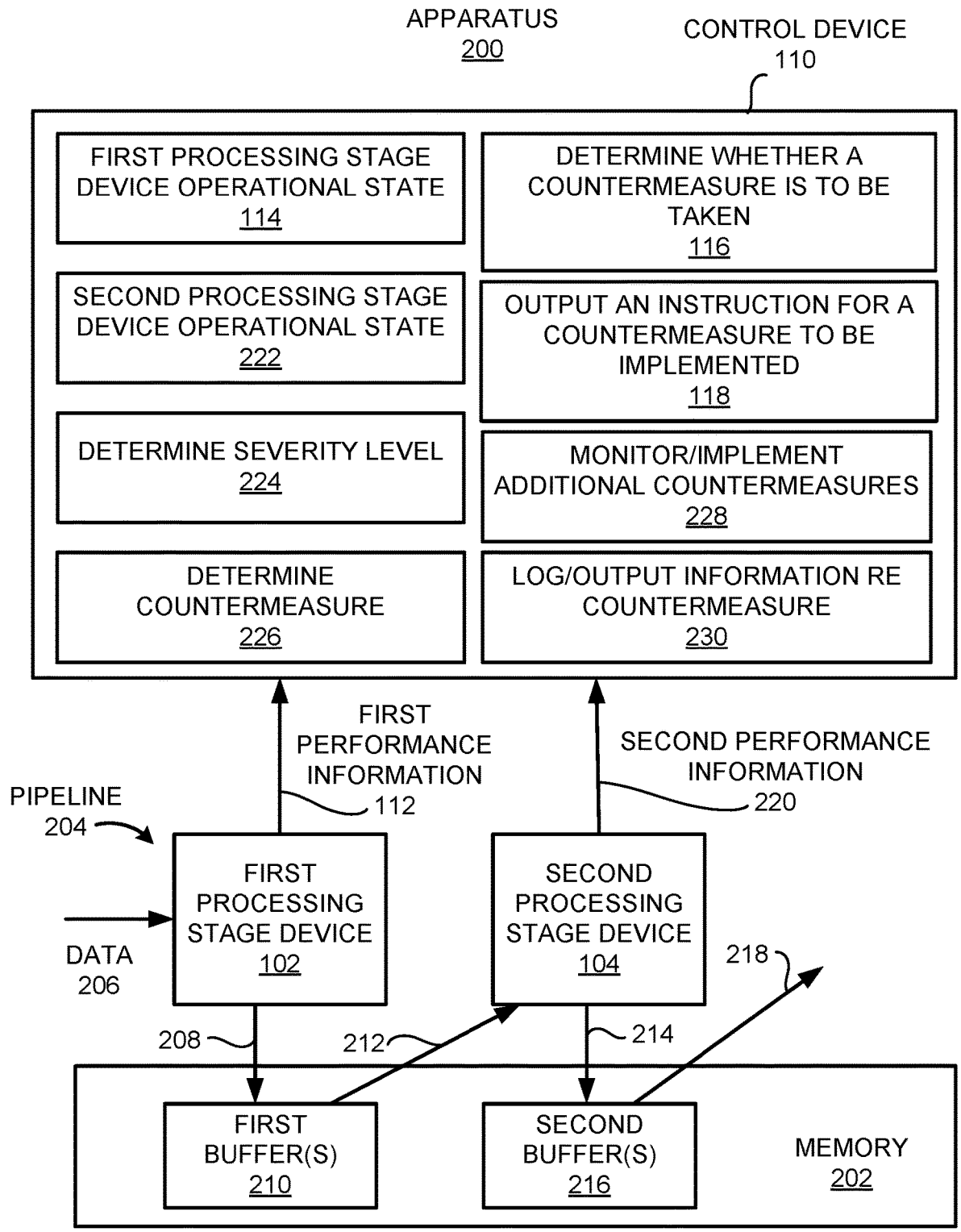
FIG. 2 depicts a block diagram of an example apparatus for managing operational states of a first processing stage device and a second processing stage device.

Turning now to FIG. 2, there is shown a block diagram of an example apparatus 200 for managing operational states of a first processing stage device 102 and a second processing stage device 104. Particularly, the apparatus 200 may manage the operational state of the first processing stage device 102 and the second processing stage device 104 through monitoring of performance information and determining whether a countermeasure is to be taken based on the monitored performance information. It should be understood that the apparatus 200 depicted in FIG. 2 may include additional features and that some of the features described herein may be removed and/or modified without departing from the scope of the apparatus 200.

The apparatus 200 may include some of the same components as shown in the apparatus depicted in FIG. 1. As such, the components having the same reference numerals as the components depicted in FIG. 1 are not described in detail again, but instead, the descriptions of those components are applicable to the components depicted in FIG. 2. In addition to the common components, the apparatus 200 may include a memory 202 to which first processing state device 102 and the second processing stage device 104 may store data and from which the second processing stage device 104 may access or retrieve stored data. The memory 202 may be a Random Access memory (RAM), an Electrically Erasable Programmable Read-Only Memory (EEPROM), a storage device, an optical disc, or the like.

As shown, and as discussed herein, the first processing stage device 102 and the second processing stage device 104 may be components in a pipeline 204 of processes that are to perform an operation. As shown, the first processing stage device 102 may receive incoming data 206 and may process the data 206. As discussed herein, the first processing stage device 102 may process the data 206 as part of a printing operation, an image displaying operation, or the like. In addition, the first processing stage device 102 may store the process data 208 in a first buffer 210 or in multiple first buffers 210. For instance, the first processing stage device 102 may process respective portions of a page of data, e.g., particular set of lines in the page, particular sections of a page of data, or the like, and may store each of the portions in a separate first buffer 210.

The second processing stage device 104 may access the processed data 212 from the first buffer(s) 210. In addition, the second processing stage device 104 may further process the processed data 212, for instance, as part of the next stage in the pipeline 204. The second processing stage device 104 may store the further processed data 214 in a second buffer 216 or in multiple seconds buffers 216. For instance, the second processing stage device 104 may process respective portions of the processed data 212, e.g., particular set of lines in the processed data 212, particular sections of the processed data 212, or the like, and may store each of the portions in a separate second buffer 216. In addition, a further processing stage device (not shown) may access the further processed data 218 from the second buffer(s) 216 and further processes may be implemented on the data. In one regard, therefore, the apparatus 200 may include additional processing stage devices in the pipeline 204 to perform additional processes until the data is ready for printing, displaying, or the like.

According to examples, in order for the second processing stage device 104 to operate at a particular speed or rate, a certain number of first buffers 210 may be maintained during a processing operation. Thus, for instance, the control device 110 may determine that the operational state 114 of the first processing stage device 102 may be at an unhealthy state based on a determination that the number of first buffers 210 falls below a predefined level. That is, the first processing stage device 102 may be operating at a state that may result in the data processing operations in the pipeline 204 slowing down.

As shown, the control device 210 may access, e.g., receive, the first performance information 112 regarding the first processing stage device 102. In addition, the control device 210 may access second performance information 220 from the second processing stage device 104. The second performance information 220 may include the parameters or metrics regarding the second processing stage device 104 that may be monitored. For instance, the parameters or metrics may include a number of first buffers 210 currently ready for the second processing stage device 104 to access, a buffer fill/drain rate for the second processing stage device 104, a pixel processing rate of the second processing stage device 104, an idle/active time measure for the second processing stage device 104, a block processing average rate for the second processing stage device 104, a source data rate measure for the second processing stage device 104, and/or the like. According to examples, the second processing stage device 104 may track the parameters or metrics regarding the second processing stage device 104 and may submit the second performance information 220 corresponding to the tracked parameters or metrics to the control device 110. In other examples, a device external to the second processing stage device 104 may monitor the parameters or metrics and may submit the second performance information 220 to the control device 110.

The control device 110 may determine, from the accessed first performance information 112, a first processing stage device operational state 114 as discussed herein. The control device 110 may also determine, from the accessed second performance information 220, a second processing stage device operational state 222. The operational state 222 of the second processing stage device 104 may be, for instance, whether the second processing stage device 104 is operating at an intended rate. For instance, the control device 110 may determine that the second processing device 104 is at a first operational state based on the second performance information 222 indicating that a parameter is above a second predefined threshold. In addition, the control device 110 may determine that the second processing device 104 is at a second operational state based on the second performance information 220 indicating that the parameter is below the second predefined threshold. As the first processing stage device 102 and the second processing stage device 104 may process the data at different rates with respect to each other, the predefined thresholds used to determine the operational states 114, 222 may differ from each other.

In other examples, the control device 110 may determine that the second processing device 104 is at any of a number of other operational states. For instance, the control device 110 may determine whether the parameter identified in the second performance information 220 falls below or exceeds a number of predefined thresholds, in which each of the predefined thresholds may correspond to a particular operational state. In these examples, the control device 110 may determine which of the predefined thresholds the identified parameter exceeds or falls below. Based on that determination, the control device 110 may determine the operational state 222 of the second processing stage device 104.

The various operational states 114, 222 may also correspond to different severity levels. For instance, a first operational state 114, 222 may correspond to a low severity level, a second operational state 114, 222 may correspond to a high severity level, and a third operational state 114, 222 may correspond to a critical severity level. The severity levels may be based, for instance, on the likelihood that the first processing stage device 102 or the second processing stage device 104 may be operating at a level that may cause a slowdown or a stoppage in the data processing pipeline 204. According to examples, the control device 110 may determine the severity level(s) 224 of the operational states 114, 222. In addition, the control device 110 may determine a countermeasure 226 (or, equivalently, a corrective action 226) to be taken based on the determined severity level(s) 224.

In some examples, the control device 110 may determine the countermeasure 226 prior to determining whether a countermeasure is to be taken 116. In other examples, the control device 110 may determine the countermeasure 226 after determining that a countermeasure is to be taken 116. In any regard, the control device 110 may determine the countermeasure 226 by selecting the countermeasure from a set or pool of available countermeasures. Particularly, the control device 110 may determine the countermeasure 226 that is likely to improve the operational state of the first processing stage device 102 and/or the second processing stage device 104. For instance, the control device 110 may determine the countermeasure 226 that is likely to prevent a slowdown or other problem from occurring or to correct a slowdown or other problem that has occurred. In addition, the control device 110 may output an instruction for the countermeasure to be implemented 118 as discussed herein.

Following the output 118 of the instruction and thus, implementation of the determined countermeasure, the control device 110 may continue to monitor 228 the operational state 114 of the first processing stage device 102 to determine whether the first processing stage device 102 has returned to a state above the predefined threshold level. Based on a determination that the first processing stage device 102 has returned to a state above the predefined threshold level within a certain period of time, the control device 100 may cause the countermeasures to be reverted back to their standard operating conditions. Alternately, in instances in which the control device 110 determines that the state of the first processing stage device 102 continues to degrade, the control device 110 may determine 228 that additional and/or more aggressive countermeasures may be implemented and may cause the more aggressive countermeasures to be implemented.

The control device 110 may also log 230 a history of the implemented countermeasure or information pertaining to the implemented countermeasure. For instance, the control device 110 may a log a history of information pertaining to the implemented countermeasures. The information may include, for instance, the first performance information 112 and/or the second performance information 220 that caused the operational state 114, 222 for which a the countermeasure was implemented. The information may also include the countermeasure that was implemented. The control device 110 or another device may determine a health status of the first processing stage device 102 and/or the second processing stage device 104 from the logged history.

For instance, the control device 110 or another device may accumulate the information over time to determine a health of the first processing stage device 102, the second processing stage device 104, and/or the apparatus 100. By way of example, the control device 110 or another device may use the accumulated information to help analytics determine a healthy or desired performance signature of the first processing stage device 102, the second processing stage device 104, and/or the apparatus 100. The control device 110 or another device may use this performance signature to identify or predict when the first processing stage device 102, the second processing stage device 104, and/or the apparatus 100 may enter an operational state that may correspond to a potential slowdown or failure occurring. In one regard, the control device 110 or another device may preemptively determine that a countermeasure is to be taken 116.

The control device 110 or another device may also identify, from the logged information, components for which countermeasures are taken more frequently than other components. The control device 110 or another device may output this determination such that other diagnostic tests may be performed and other actions may be taken.

According to examples, the other device may be a cloud based server and the control device 110 may output 230 the information regarding the countermeasure to the cloud based server over a network, e.g., the Internet. In these examples, the cloud based server may collect this type of information from a number of control devices 110 or other systems and may generate the performance signature from the collected information. As the pool of control devices 110 and other systems may provide a greater amount of information, the server may generate more accurate and comprehensive performance signatures.

According to examples, the control device 110 may take immediate, short-term countermeasures to, for instance, prevent an immediate system deadline at hand from being missed. In addition, the cloud based server may monitor the countermeasures that the control device 110 has taken and may identify aggregate patterns that indicate broader problems. By way of particular example, the control device 110 may apply a short term countermeasure on every single page in order to prevent a mis-printed page because the laser data underran the physical laser timing. In this example, the countermeasure may work and the pages may be printed as intended. However, the control device 110 may consistently be performing in a crisis state. As a result, the cloud based server may determine that the control device 110 is operating in this manner and, for instance, by running a system diagnosis, identify that a hard disk is constantly causing retries/error correction cycles that are slowing down the data delivery. The cloud based server may thus output an instruction for a technician to replace the hard disk during a next service call.

Figure 4:
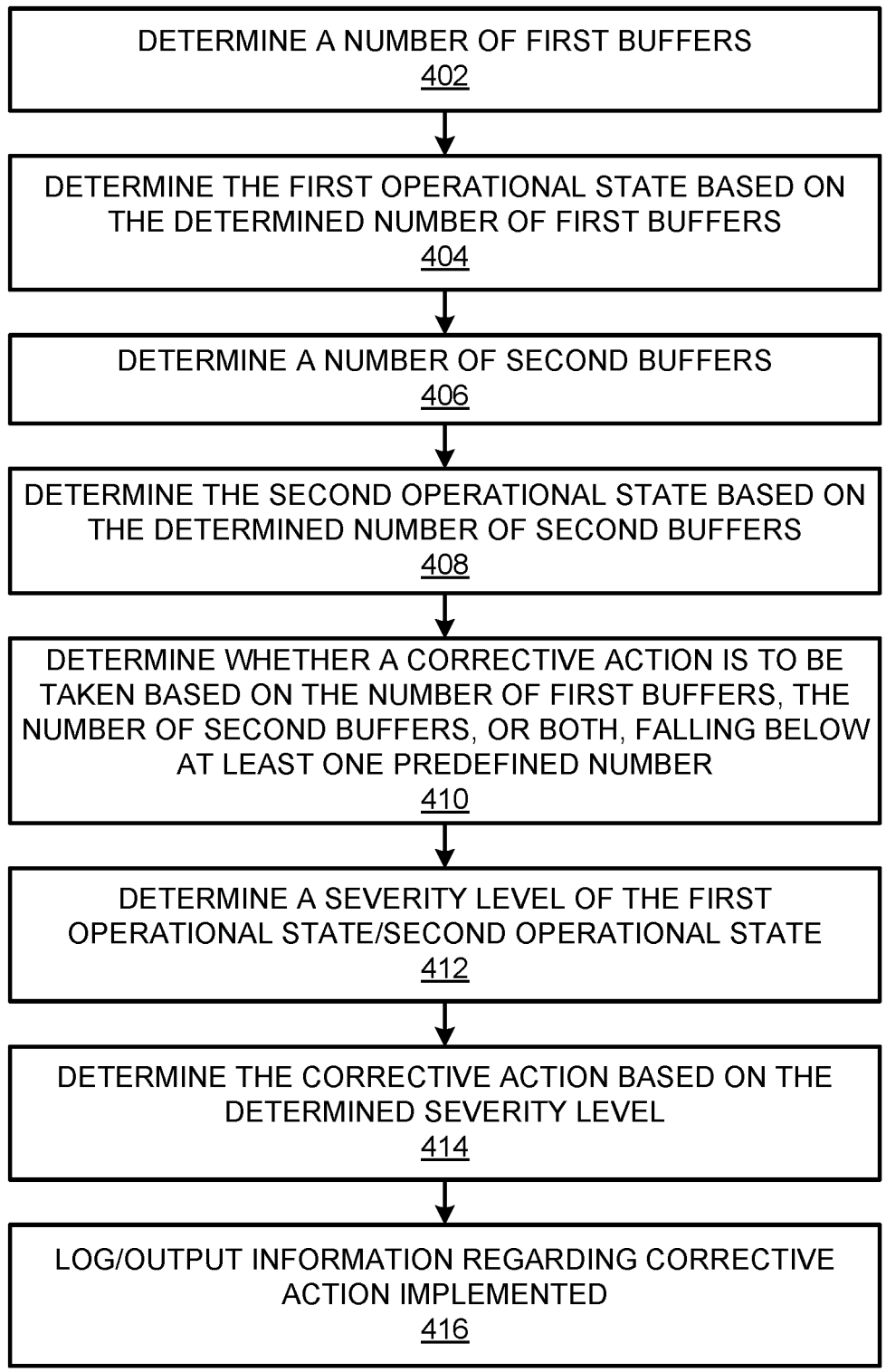

Various manners in which the control device 110 may operate are discussed in greater detail with respect to the methods 300 and 400 depicted in FIGS. 3 and 4. Particularly, FIGS. 3 and 4, respectively, depict flow diagrams of example methods 300 and 400 for managing operational states of a first processing stage device 102 and a second processing stage device 104. It should be understood that the methods 300 and 400 depicted in FIGS. 3 and 4 may include additional operations and that some of the operations described therein may be removed and/or modified without departing from the scopes of the methods 300 and 400. The descriptions of the methods 300 and 400 are made with reference to the features depicted in FIGS. 1 and 2 for purposes of illustration.

With reference first to FIG. 3, at block 302, the control device 110 may access first performance information 112 of a first processing stage device 102. As discussed herein, the control device 110 may receive the first performance information 112 from the first processing stage device 102.

At block 304, the control device 110 may access second performance information of a second processing stage device 104. The second processing stage device 104 may process data that the first processing stage device 102 has processed. As such, for instance, the second processing stage device 104 may be a later stage than the first processing stage device 102 in a processing pipeline 204. In addition, the control device 110 may receive the second performance information 220 from the second processing stage device 104.

At block 306, the control device 110 may determine a first operational state 114 of the first processing stage device 102 from the accessed first performance information 112. In addition, at block 308, the control device 110 may determine a second operational state 222 from the accessed second performance information 220.

At block 310, the control device 110 may determine whether a corrective action is to be taken based on the first operational state, the second operational state, or both. As discussed herein, the corrective action may be taken to improve the first operational state 114. In addition or in other examples, the corrective action may be taken to improve the second operational state 222. At block 312, the control device 110 may, based on a determination that the corrective action is to be taken, output an instruction for the corrective action to be implemented.

Following block 310, the control device 110 may continue to monitor the operational state 114 of the first processing stage device 102 to determine whether the first processing stage device 102 has returned to a state above the predefined threshold level. Based on a determination that the first processing stage device 102 has returned to a state above the predefined threshold level within a certain period of time, the control device 100 may cause the countermeasures to be reverted back to their standard operating conditions. Alternately, in instances in which the control device 110 determines that the state of the first processing stage device 102 continues to degrade, the control device 110 may determine 228 that additional and/or more aggressive countermeasures may be implemented and may cause the more aggressive countermeasures to be implemented.

Turning now to FIG. 4, at block 402, the control device 110 may determine a number of first buffers 210 stored in the memory 202. That is, the control device 110 may determine the number of first buffers 210 in the memory 202 containing data 208 processed by the first processing stage device 102. As discussed herein, the first processing stage device 102 may store the processed data 208 into the first buffers 210 as the first processing stage device 102 processes the data. The determined number of first buffers 210 may be the first performance information 112 of the first processing stage device 102. In addition, at block 404, the control device 110 may determine the first operational state 114 based on the determined number of first buffers 210 in the memory 202.

At block 406, the control device 110 may determine a number of second buffers 216. That is, the control device 110 may determine the number of second buffers 216 in the memory 202 containing data 214 processed by the second processing stage device 104. As discussed herein, the second processing stage device 104 may store the processed data 214 into the second buffers 216 as the second processing stage device 104 processes the data. The determined number of second buffers 216 may be the second performance information 220 of the second processing stage device 104. In addition, at block 408, the control device 110 may determine the second operational state 222 based on the determined number of second buffers 216 in the memory 202.

At block 410, the control device 110 may determine whether a corrective action is to be taken based on the number of first buffers 210, the number of second buffers 216, or both, falling below at least one predefined number. That is, for instance, the control device 110 may determine whether a corrective action is to be taken based on the number of first buffers 210 falling below a first predefined number. In addition, or alternatively, the control device 110 may determine whether a corrective action is to be taken based on the number of second buffers 216 falling below a second predefined number. As the second processing stage device 104 may process data at a different rate as compared with the rate at which the first processing stage device 104 may process data, the second predefined number may differ from the first predefined number.

At block 412, the control device 110 may determine a severity level of the first operational state 114 and/or of the second operational state 222. According to examples, the control device 110 may determine that the first operational state 114 and/or the second operational state 222 may be at one of a plurality of severity levels based on, for instance, the level of the first operational state 114 and/or the second operational state 222. By way of example in which a nominal operational state includes the first processing state device 102 maintaining ten first buffers 210 at a certain time, the control device 110 may determine that the first operational state 114 has a low severity level based on the first processing state device 102 currently maintaining eight first buffers 210. As another example, the first processing state device 102 may determine that the first operational state 114 has a critical severity level based on the first processing state device 102 currently maintaining three first buffers 210.

At block 414, the control device 110 may determine a corrective action to be taken based on the determined severity level. That is, for instance, the control device 110 may select the corrective action from a set of available corrective actions, in which the corrective actions may correspond to respective severity levels. For instance, the control device 110 may select a corrective action that may be potentially more disruptive to the components of the apparatus 100, 200 for operational states 112, 222 having higher severity levels. The control device 110 may also output an instruction for the determined corrective to be implemented. The control device 110 may determine and apply the corrective action quickly in order to avert an impending event of the system to fail to meet a predefined real-time data delivery schedule.

At block 416, the control device 110 may log and/or output information regarding the implemented corrective action. The information regarding the implemented corrective action may include an identification of the processing stage device 102, 104 that may have triggered implementation of the corrective action, the corrective action that was taken, etc. As discussed herein, the control device 110 or another device, such as a cloud based server, may analyze the ongoing logs of information to identify parameters and patterns of healthy apparatuses, and therefore also be able to identify individual systems where a longer term corrective action is to be implemented, determine whether there may be larger issues with respect to components in the apparatus 110 such as impending failure, sub-par performance, unacceptably high rate of data corruption/retries, identify mis-configured devices, etc.

Some or all of the operations set forth in the methods 300 and 400 may be included as utilities, programs, or subprograms, in any desired computer accessible medium. In addition, the methods 300 and 400 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 5:
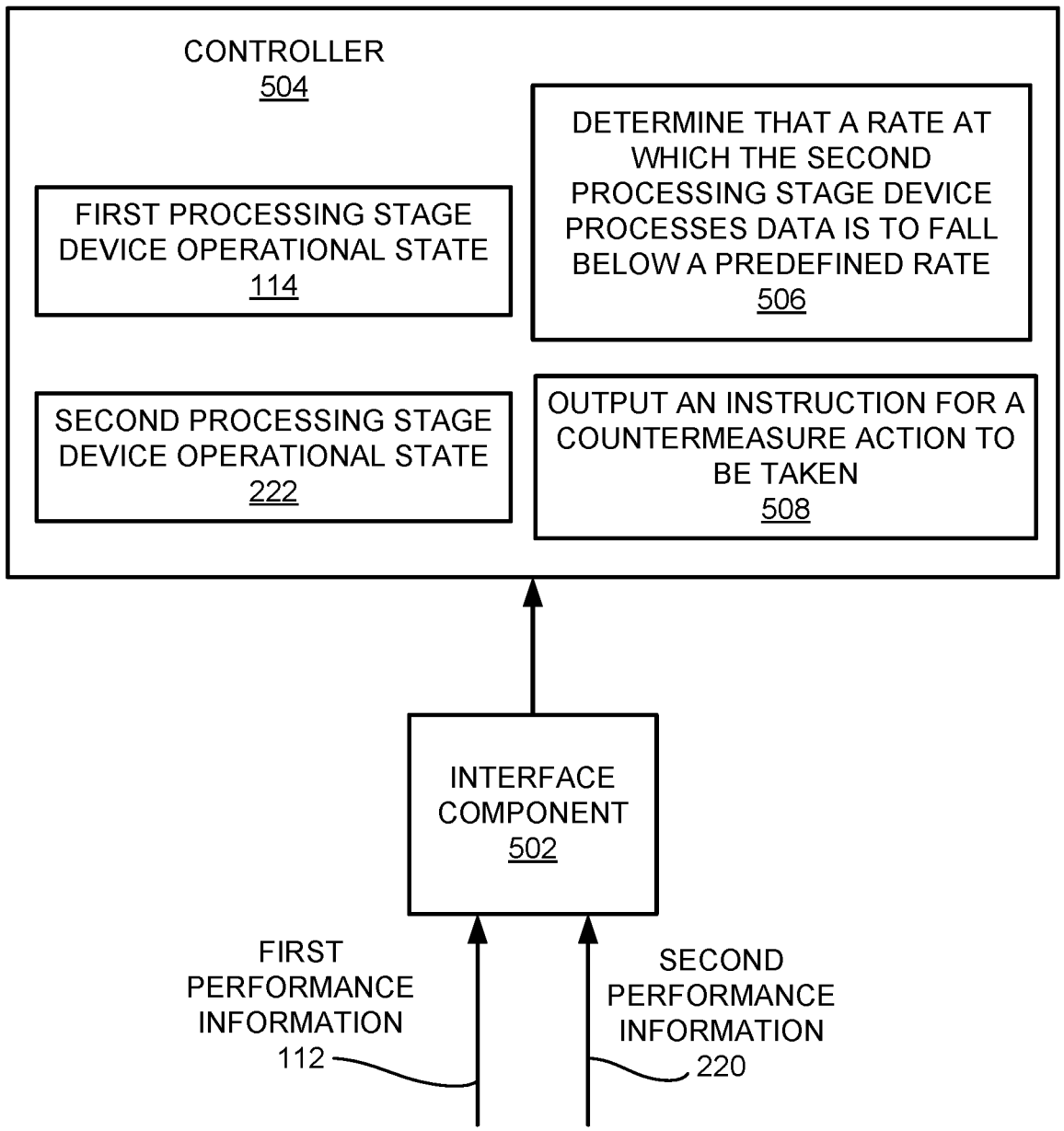
FIG. 5 depicts a block diagram of an example control device for managing operational states of a first processing stage device and a second processing stage device.

Turning now to FIG. 5, there is shown a block diagram of an example control device 500 for managing operational states of a first processing stage device and a second processing stage device. Particularly, the control device 500 may manage the operational state of the first processing stage device and the second processing stage device through monitoring of performance information and determining whether a countermeasure is to be taken based on the monitored performance information. It should be understood that the control device 500 depicted in FIG. 5 may include additional features and that some of the features described herein may be removed and/or modified without departing from the scope of the control device 500.

The control device 500 may include an interface component 502 and a controller 504. The interface component 502 may include hardware and/or software to that may function to manage receipt of information into the controller 504. For instance, the interface component 502 may receive first performance information 112 from a first processing stage device 102 and second performance information 220 from a second processing stage device 104. The controller 504 may be a dedicated hardware block, such as a central processing unit, a microprocessor, a circuit component, an application specific integrated circuit (ASIC), a chip, a field-programmable gate array (FPGA), and/or other hardware device. According to examples, the controller 504 may be a processor that may execute firmware and/or software. For instance, the controller 504 may be a processor that may access a memory on which machine readable instructions that provide the functionality for the controller 504 may be stored.

The controller 504 may determine, from the received first performance information 112 of the first processing stage device 102, a first operational state 114 of the first processing stage device 102. The controller 504 may also determine, from the received second performance information 220 of the second processing stage device 104, a second operational state 222 of the second processing stage device 104. The controller 504 may also determine, based on the first operational state 114, the second operational state 222, or both, that a rate at which the second processing stage device 104 processes data is to fall below a predefined rate 506. The controller 504 may further, based on a determination that the rate at which the second processing stage device 104 processes data is likely to fall below the predefined rate, output 508 an instruction for a countermeasure action to be taken to improve the rate at which the second processing stage device 104 processes data.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
   a first processing stage device to process data and store the processed data that the first processing state device has processed in first buffers;
   a second processing stage device to process the processed data stored in the first buffers; and
   a control device to:
      access first performance information of the first processing stage device including a number of the first buffers that store the processed data;
      determine an operational state of the first processing stage device based on the number of the first buffers that store the processed data;
      determine whether a countermeasure is to be taken based on the operational state of the first processing stage device, including determining that the countermeasure is to be taken based on the number of the first buffers that store the processed data falling below a first predefined number of buffers, wherein the countermeasure is to improve the operational state of the first processing stage device; and
      based on a determination that the countermeasure is to be taken, output an instruction for the countermeasure to be implemented.

2. The apparatus of claim 1, wherein the control device is further to:
   access second performance information of the second processing stage device;
   determine, from the accessed second performance information, an operational state of the second processing stage device;
   determine whether a second countermeasure is to be taken based on the determined operational state of the second processing stage device, wherein the second countermeasure is to improve an operational state of the second processing stage device; and
   based on a determination that a second countermeasure is to be taken, output an instruction for the second countermeasure action to be implemented.

3. The apparatus of claim 2, wherein the first buffers are in a memory.

4. The apparatus of claim 3, wherein the second processing stage device is to:
   access the processed data stored in the first butters in the memory;
   process the accessed data to generate second processed data;
   store the second processed data in second buffers in the memory, wherein the second performance information comprises a number of the second buffers in the memory, and
   wherein the control device is further to: determine that a second countermeasure is to be taken based on the number of the second buffers storing the second processed data falling below a second predefined number of buffers.

5. The apparatus of claim 1, wherein the first processing stage device and the second processing stage device comprise processing stage devices in a pipeline of one of a printing operation or a graphical display operation.

6. The apparatus of claim 1, Wherein the control device is further to:
   determine a severity level of the operational state of the first processing stage device; and
   select the countermeasure from a set of countermeasures based on the determined severity level of the operation state.

7. The apparatus of claim 6, wherein the set of countermeasures comprises at least two of:
   temporarily modify bus arbitration priorities to unfairly favor critical stages in a pipeline;
   modify power consumption policies to temporarily allow additional performance;
   raise critical thread priorities;
   lower non-critical thread priorities;
   suspend non-critical operations;
   suspend or divert contending processes to other resources; or
   re-allocate memory to critical operations.

8. The apparatus of claim 1, wherein the control device is further to:
   log a history of information pertaining to the implemented countermeasure; or
   output the information pertaining to the implemented countermeasure to an external server.

9. A method comprising:
   accessing, by a control device, first performance information of a first processing stage device that is to process data and store the processed data in first buffers, wherein the accessed first performance information includes a number of the first buffers that store the processed data;
   accessing, by the control device, second performance information of a second processing stage device that is to process the processed data stored in the first buffers;
   determining, by the control device, a first operational state of the first processing stage device based on the accessed first performance information including the number of the first buffers that store the processed data;
   determining, by the control device, whether a corrective action is to be taken based on the first operational state of the first processing stage device, including determining that the corrective action is to be taken based on the number of the first buffers that store the processed data falling below a first predefined number of buffers, wherein the corrective action is to improve the first operational state; and
   based on a determination that the corrective action is to be taken, outputting, by the control device, an instruction for the corrective action to be implemented.

10. The method of claim 9, wherein the first buffers are in a memory.

11. The method of claim 10, wherein the second processing stage device is to process the accessed data to generate second processed data, store the second processed data in second buffers in the memory, wherein the second performance information comprises a number of the second buffers storing the second processed data, and wherein the method further comprises:
- determining a second operational state of the second processing device based on the number of the second buffers in the memory storing the second processed data; and
- determining that another corrective action is to be taken based on the number of the second buffers storing the second processed data falling below a second predefined number of buffers.

12. The method of claim 9, further comprising:
- determining a severity level of the first operational state of the first processing stage device; and
- selecting the corrective action from a set of corrective actions based on the determined severity level of the first operation state.

13. The method of claim 9, further comprising:
- logging a history of information pertaining to the corrective action; and
- determining a health status of the first processing stage device based on the logged history.

14. The method of claim 9, further comprising:
- outputting information pertaining to the corrective action to an external server, wherein the external server is to determine a health status of the first processing stage device based on the information.

15. A control device comprising:
- an interface component to receive first performance information of a first processing stage device and second performance information of a second processing stage device, wherein the first performance information includes a number of first buffers that store processed data that the first processing stage device has processed, and wherein the second processing stage device is to process the processed data stored in the first buffers;
- a controller to:
  - determine a first operational state of the first processing stage device based on the number of the first buffers that store the processed data;
  - determine an operational state of the first processing stage device based on the number of the first buffers that store the processed data;
  - determine whether a countermeasure is to be taken based on the operational state of the first processing stage device, including determining that the countermeasure is to be taken based on the number of the first buffers that store the processed data falling below a first predefined number of buffers, wherein the countermeasure is to improve the operational state of the first processing stage device; and
  - based on a determination that the countermeasure is to be taken, output an instruction for the countermeasure to be implemented.

16. The control device of claim 15, wherein the controller is further to:
- determine a second operational state of the second processing stage device based on the received second performance information of the second processing stage device;
- based on the second operational state, determine that a rate at which the second processing stage device processes the processed data is to fall below a predefined rate; and
- based on the determination that the rate at which the second processing stage device processes the processed data is to fall below the predefined rate, output an instruction for a second countermeasure action to be taken to improve the rate at which the second processing stage device processes the processed data.

\* \* \* \* \*